(12) United States Patent
Moreth

(10) Patent No.: US 6,701,158 B2
(45) Date of Patent: Mar. 2, 2004

(54) USE CONTROLLER FOR A WIRELESS COMMUNICATION DEVICE

(76) Inventor: R. Edward Moreth, 3290 NE. 33rd St., Fort Lauderdale, FL (US) 33308

( * ) Notice: Subject to any disclaimer, the term of this patent is extended or adjusted under 35 U.S.C. 154(b) by 0 days.

(21) Appl. No.: 10/021,069

(22) Filed: Dec. 19, 2001

(65) Prior Publication Data

US 2003/0114183 A1 Jun. 19, 2003

(51) Int. Cl.[7] .............................. H04B 7/00; H04Q 7/20
(52) U.S. Cl. ................. 455/528; 455/456.1; 455/414.1; 455/411; 340/539.1
(58) Field of Search .................................. 455/528, 456, 455/414, 411, 67.3, 99, 95, 283, 285, 404; 46/296; 340/539, 468, 438, 457, 461

(56) References Cited

U.S. PATENT DOCUMENTS 5,543,779 A * 8/1996 Aspesi et al. ............... 340/539
5,991,614 A * 11/1999 Oura .......................... 455/404

FOREIGN PATENT DOCUMENTS

JP 10-294970 * 11/1998

* cited by examiner

*Primary Examiner*—Sinh Tran
*Assistant Examiner*—Huy Nguyen
(74) *Attorney, Agent, or Firm*—M. K. Silverman

(57) ABSTRACT

The invention relates to a system for the blocking of transceptions of a wireless communication device situated within an area or space designated, for purposes of safety or security, for protection from selectable electromagnetic frequencies. The system, more particularly, includes elements for detecting and identifying the selected frequencies transmitted from the wireless device; a subsystem for blocking the frequencies which are received by the device; elements for electronic communication between the detecting elements and the blocking elements; and an actuator for the blocking elements. The system must be situated within sufficient physical relationship to the wireless communication device to permit reception of frequencies generated by it and the transmission, without use of unacceptable power levels, of blocking noise.

20 Claims, 1 Drawing Sheet

USE CONTROLLER FOR A WIRELESS COMMUNICATION DEVICE

BACKGROUND OF THE INVENTION

The instant invention relates to systems and methods for providing enhanced security and safety within spaces, such as the interior of automobiles and airplanes, where the use of cellular phones or other wireless devices might pose a safety or security problem. A need for an invention of the present type has become more apparent as a result of both the increase in auto accidents related to the use of cellular phones while driving and, as well, as a result of security concerns associated with the use of wireless devices upon means of public transportation and, particularly, commercial airliners.

It has also become appreciated that, within the context of a proper system, for the control of use of wireless devices, emergency messages can be more efficiently communicated to emergency response personnel, such as doctors, law enforcement personnel, and governmental officials when and if it becomes necessary to contact such individuals when they are not at their normal offices or places of business.

The present invention may be therefore be viewed as a response to various needs related to safety and security which have recently originated as a result of a proliferation in the use of wireless devices including cell phones and palm-held computer devices and the like. This problem has not been addressed in the prior art.

SUMMARY OF THE INVENTION

The invention relates to a system for the blocking of transceptions of a wireless communication device situated within an area or space designated, for purposes of safety or security, for protection from selectable electromagnetic (hereinafter "EM") frequencies. The system, more particularly, comprises means for detecting and identifying selected EM frequencies transmitted from the wireless device; means for blocking said frequencies which are transmitted from the wireless device; means for electronic communication between said detecting means and said blocking means; and means for actuation of said blocking means. Said system must be situated within sufficient physical relationship to said wireless communication device in order to permit reception of frequencies generated thereby and the transmission, without use of unacceptable power levels, of blocking noise thereto.

It is accordingly an object of the present invention to provide a means of enhanced safety for drivers and passengers of vehicles where a driver thereof might otherwise be distracted during the use of a cellular telephone.

It is another object to provide a security device which will substantially automatically block usage of cellular phones and wireless devices within sensitive public spaces, such as commercial airliners, during periods when usage of such devices could pose a safety or security issue for such aircraft.

It is a further object of the invention to provide a system and method of the above type by which a small substantially hand held system may be selectably placed within a vehicle, such as an automobile or boat, for the selectable blocking of transmissions from wireless devices when the vehicle is within jurisdiction prohibiting the use of such devices by operators of such vehicles.

It is a still further object to provide a system of the above type capable of generating a blocking signal or noise having sufficient power and range to preclude operation of the wireless device without presenting an EM interference problem with respect to other electronic and communication systems.

It is a still further object to provide a system of the above type capable of identifying and blocking transmissions relative to several different EM frequencies simultaneously or switched, as required.

The above and yet other objects and advantages of the present invention will become apparent from the hereinafter set forth Brief Description of the Drawing, Detailed Description of the Invention, and Claims appended herewith.

DETAILED DESCRIPTION OF THE INVENTION

Figure 1:
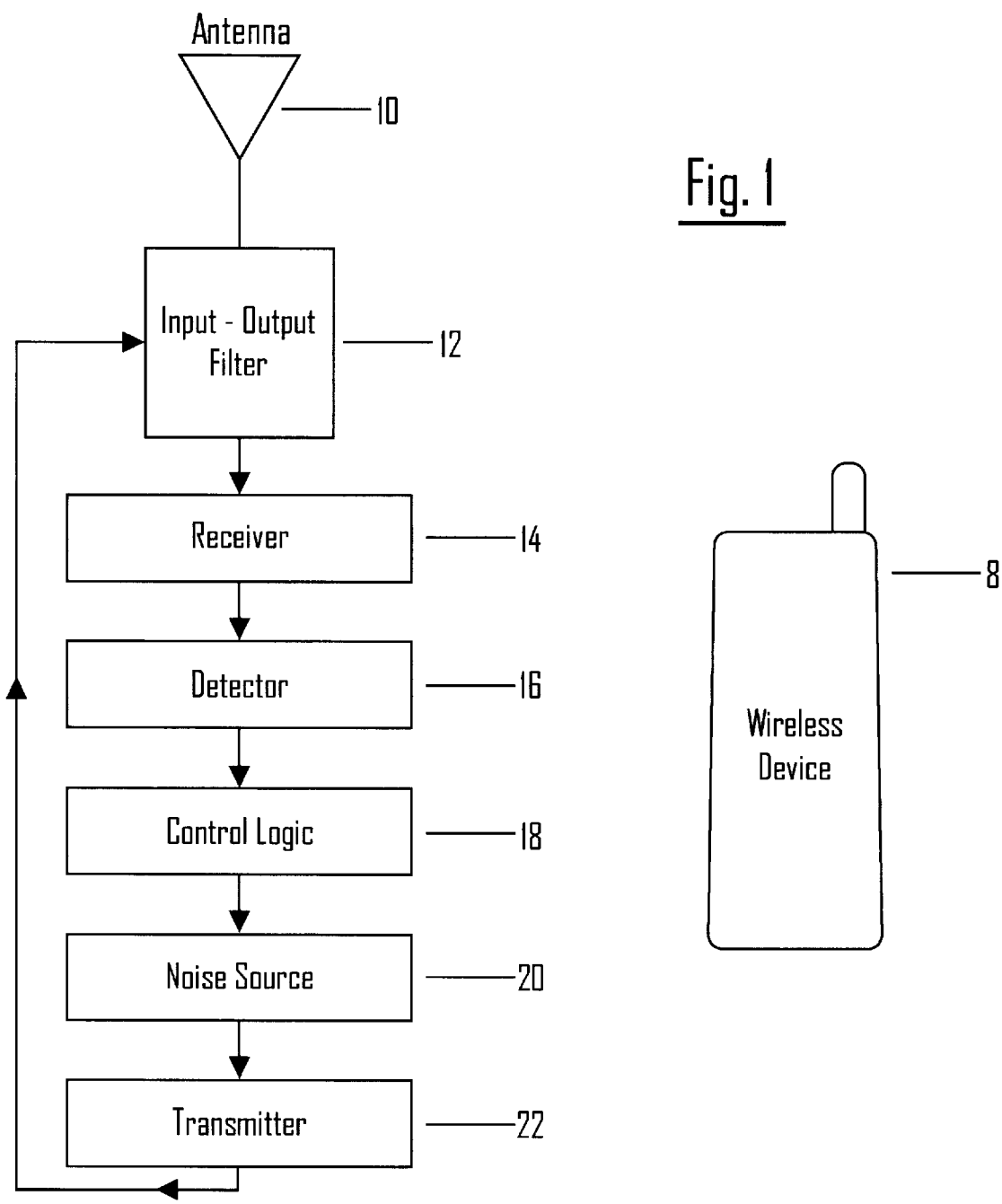
FIG. 1 is a block diagrammatic view of the inventive system.

With respect to FIG. 1, the inventive system for the selectable blocking of transmission of a wireless communication device 8 may be seen to include an antenna 10 and an input/output filter 12. Only one or more frequencies of interest, that is, RF frequencies to be blocked are permitted to pass through filter 12 to a system receiver 14, the output of which is fed into a detector 16, the function of which is to verify that a signal having a frequency to be blocked has been received by antenna 10. That is, antenna 10, filter 12, receiver 14 and detector 16 collectively comprise means for detecting and identifying selected EM frequencies transmitted by said device 8. If confirmation of a signal to be blocked occurs, this information is electronically related to system control logic 18 which includes a timing function as well as means for recognition of a system override signal that, for example, may take the form of a sideband attached to transmissions from a wireless tower (not shown). Such emergency override signals will be of value where it is important to suspend operation of the system where an emergency or high security message must be transmitted to the holder/operator of the wireless device. Also, device 8 may itself be provided with such an override capability.

Following receipt of an actuation signal from detector 16, and after confirming that there is no security override attached to an incoming signal from a tower or the wireless device 8, control logic 18 will actuate a noise source 20 having a frequency and power sufficient to preclude any further transmission from wireless device 8. It is noted that control logic 18 will also determine the duration of operation of noise source 20, so as to both preclude permanent disablement of the wireless device and to enable the control logic to review new, subsequent or different signals which may originate from the wireless device 8.

Said noise source 20 is then fed into a transmitter 22 which will then broadcast the noise of said noise source for a period determined by said control logic. Given that the inventive system will typically be located within the confines of an automobile or an airliner, the power level needed to transmit blocking noise to wireless device 8 will typically be minimal, i.e., but sufficient to block said EM signals.

It is to be appreciated that wireless device 8 may comprise a considerable variety of different devices including, without limitation, cellular phones, wireless computers, digital personal assistants, and the like.

It is also noted that the inventive system includes an on-off/actuation switch so that it may be selectively used when in a jurisdiction, either municipal or statewide in nature, which prohibits use of cell phones or wireless devices while operating a motor vehicle. However, it should be appreciated that, if not turned off, a device in accordance with the instant system will be in a continuous standby mode and will ignore all EM signals or frequencies outside of the selectable range, this inclusive of non-emergency incoming transmissions from cell phones or wireless towers. In other words, the instant invention actuates upon detection of a transmission from said wireless device within does not attempt to block incoming communications to the wireless device that fall within particular EM frequencies. Thereby, messages may be received in a normal fashion by a cell phone or wireless device as long as the operator does not answer the phone (or press an input key to the wireless device) and attempt to transmit. In such situations, the wireless device will take a message, forward the call to another location, or generate a beeper message to another location, meaning that in such circumstances, the inventive system would remain in a dormant standby condition. However, should the cell phone or wireless operator decide to answer an incoming call, within a few seconds of the attempted transmission by the cell phone or wireless device, said signal would be received by antenna 10, filter 12, receiver 14, and detector 16, as above set forth, thereby causing a broadcast by transmission from transmitter 22, blocking any further incoming or outgoing communication of the wireless device.

It is noted that antenna 10 may comprise a microwave antenna usable both for purpose for the input/output filter 12 and transmitter 22. It is also noted that the blocking function of the inventive system may also be de-activated remotely as another means of addressing emergency situations in which it is not desirable for the system to operate in a blocking mode.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A system for the selectably blocking transception of a wireless communication device situated within a space designated for protection from selectable EM frequencies, the system comprising:
   (a) means for detecting and identifying selected EM frequencies transmitted by said device;
   (b) means for blocking said frequencies;
   (c) means for electronic communication between said detecting means and said blocking means;
   (d) means for actuation of said blocking means; and
   (e) means for regulating a duration of operation of said blocking means.

2. The system as recited in claim 1, in which said blocking means further includes:
   means for selection of said EM frequencies to be blocked.

3. The system as recited in claim 1, in which said blocking means comprises:
   an EM noise source within said selected frequencies and having an amplitude at least equal to that of frequencies upon which said communication device normally operates.

4. The system as recited in claim 3, said system, further comprising:

means for limiting a duration of EM noise source of said blocking means after actuation thereof.

5. The system as recited in claim 3, further comprising override means to said blocking means.

6. The system as recited in claim 5, in which said override means comprise remote override means.

7. The system as recited in claim 1, the system further comprising:
   means for adjustment of a power output of said blocking means, whereby the effective range thereof may be controlled.

8. The system as recited in claim 7, in which said blocking means includes override means therefore.

9. The system as recited in claim 1, in which said means for electronic communication between said blocking and said wireless communication device comprises:
   means for detecting of any attempted transmission from said wireless communication device within said selected EM frequencies within said designated space.

10. The system as recited in claim 9, further comprising:
    means for receiving transmission from said device to means for generating said EM noise within said selected frequencies, thereby blocking reception by said wireless device of any further signals upon said selected EM frequencies.

11. The system as recited in claim 9, in which said blocking means comprises:
    an EM noise source within said selected frequencies and having an amplitude at least equal to that of frequencies upon which said communication device normally operates.

12. The system as recited in claim 9, said system further comprising:
    means for limiting a duration of EM noise of said blocking means after actuation thereof.

13. The system as recited in claim 1, in which said blocking means includes a transmitter in electrical communication with a noise source.

14. A system for the selectably blocking transception of a wireless communication device situated within a space designated for protection from selectable EM frequencies, the system comprising:
    (a) means for detecting and identifying selected EM frequencies transmitted by said device;
    (b) means for blocking said frequencies;
    (c) means for electronic communication between said detecting means and said blocking means;
    (d) means for actuation of said blocking means; and
    (e) means for adjustment of a power output of said EM blocking means,
    whereby the effective range thereof may be controlled.

15. The system as recited in claim 14, in which said blocking means further includes:
    means for selection of said EM frequencies to be blocked.

16. The system as recited in claim 15, said system further comprising:
    means for limiting the duration of EM noise of said blocking means after actuation thereof.

17. The system as recited in claim 14, in which said blocking means comprises:
    means for regulating a duration of operation of said blocking means.

18. The system as recited in claim 17, in which said signal comprises:
    an EM noise source within said selected frequencies and having an amplitude at least equal to that of frequencies upon which said communication device normally operates.

19. The system as recited in claim 14, in which said blocking means include a transmitter in electrical communication with a noise source.

20. The system as recited in claim 19, in which said blocking means comprises:
   remote override means.

* * * * *